United States Patent [19]
Bayle

[11] 3,983,953
[45] Oct. 5, 1976

[54] SERVO MECHANISM

[75] Inventor: Robert Bayle, Yvelines, France

[73] Assignee: Gemmer-France, France

[22] Filed: Nov. 22, 1974

[21] Appl. No.: 526,121

Related U.S. Application Data

[63] Continuation of Ser. No. 275,771, July 27, 1972, abandoned.

[30] Foreign Application Priority Data

| July 28, 1971 | France | 71.27728 |
| Mar. 17, 1972 | France | 72.09530 |
| July 19, 1972 | France | 72.26037 |

[52] U.S. Cl. ................................. 180/79.1
[51] Int. Cl.² .................................. B62D 5/04
[58] Field of Search ......... 180/79.1, 79.2 R, 79.2 D; 74/388 PS

[56] References Cited
UNITED STATES PATENTS

| 2,248,251 | 7/1941  | Reeves         | 180/79.1    |
| 2,587,377 | 2/1952  | Penrose        | 74/388 PS   |
| 2,748,881 | 6/1956  | Holley         | 180/79.2 D  |
| 2,775,132 | 12/1956 | Orr et al.     | 74/388 PS   |
| 2,806,101 | 9/1957  | Gardes         | 180/79.1 X  |
| 2,877,656 | 3/1959  | Orr            | 180/79.1 X  |
| 2,893,504 | 7/1959  | Jackson        | 180/79.2 D  |
| 2,930,247 | 3/1960  | Zinn           | 180/79.1 X  |
| 3,011,579 | 12/1961 | Milliken et al.| 180/79.2 D  |
| 3,246,719 | 4/1966  | Lahr           | 180/79.1    |
| 3,338,328 | 8/1967  | Cataldo        | 180/79.1    |
| 3,426,863 | 2/1969  | Hanson         | 180/79.1 X  |
| 3,693,747 | 9/1972  | Nishikawa      | 180/79.2 D  |

*Primary Examiner*—M. H. Wood, Jr.
*Assistant Examiner*—John A. Pekar

[57] ABSTRACT

The invention relates to improved mechanism systems for controlling and assisting the operating effort of a mechanical member and is especially applicable to automatic assisted steering systems for automobile vehicles. The said servo-mechanism comprises essentially a steering shaft including two coaxial sections, the first section being coupled to a steering wheel for its rotation about the common axis of the two sections, while the second section is coupled to the mechanical member to be servo-controlled, this second section being fixed on an end sleeve which is coaxial and surrounds one part of the first, which is provided with a pin mounted in one of its diametral planes, the wings of said pin being identical and projecting over the same length from each side of the common axis, the second section co-operating with the first by means of the wings of said pin and an elastic member interposed between the pin and the second section. An electric servo-motor has its stator fixed with respect to the support of the mechanism and its rotor co-operates with the rotational drive about its axis of the section of the steering shaft on which the sleeve is fixed, either directly or by means of a member transmitting rotation to said section. A device for converting to electric signals, following a pre-determined law, the value of the angle of relative rotation of the section of the steering-shaft carrying the pin with respect to the section carrying the sleeve, cooperates with the section provided with the pin, and is connected by input terminals to a source of electrical energy and has output terminals connected to the supply terminals of the electric servo-motor. The relative rotation of the two sections of the steering-shaft is measured by an angular displacement detector.

18 Claims, 14 Drawing Figures

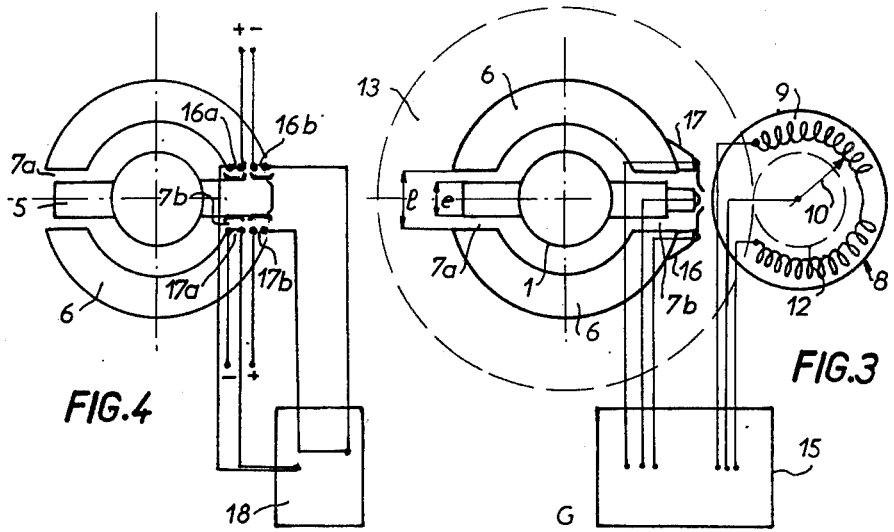
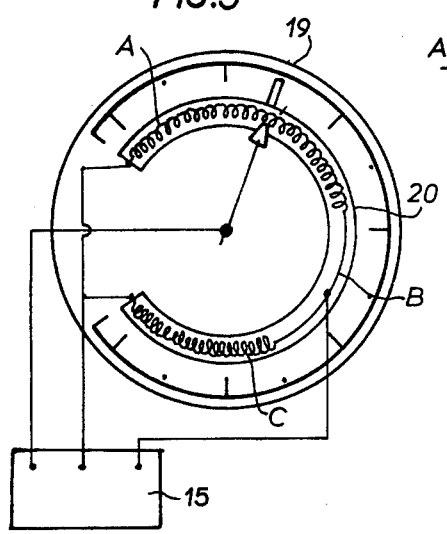
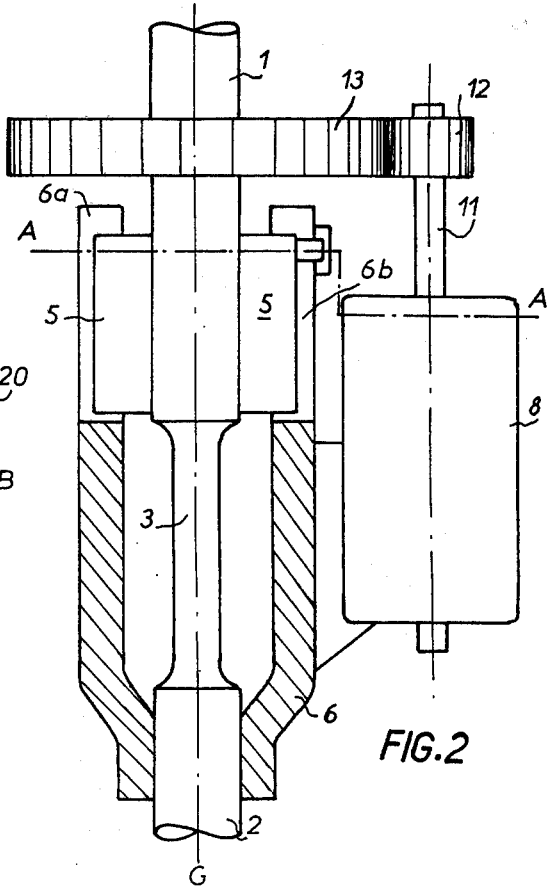

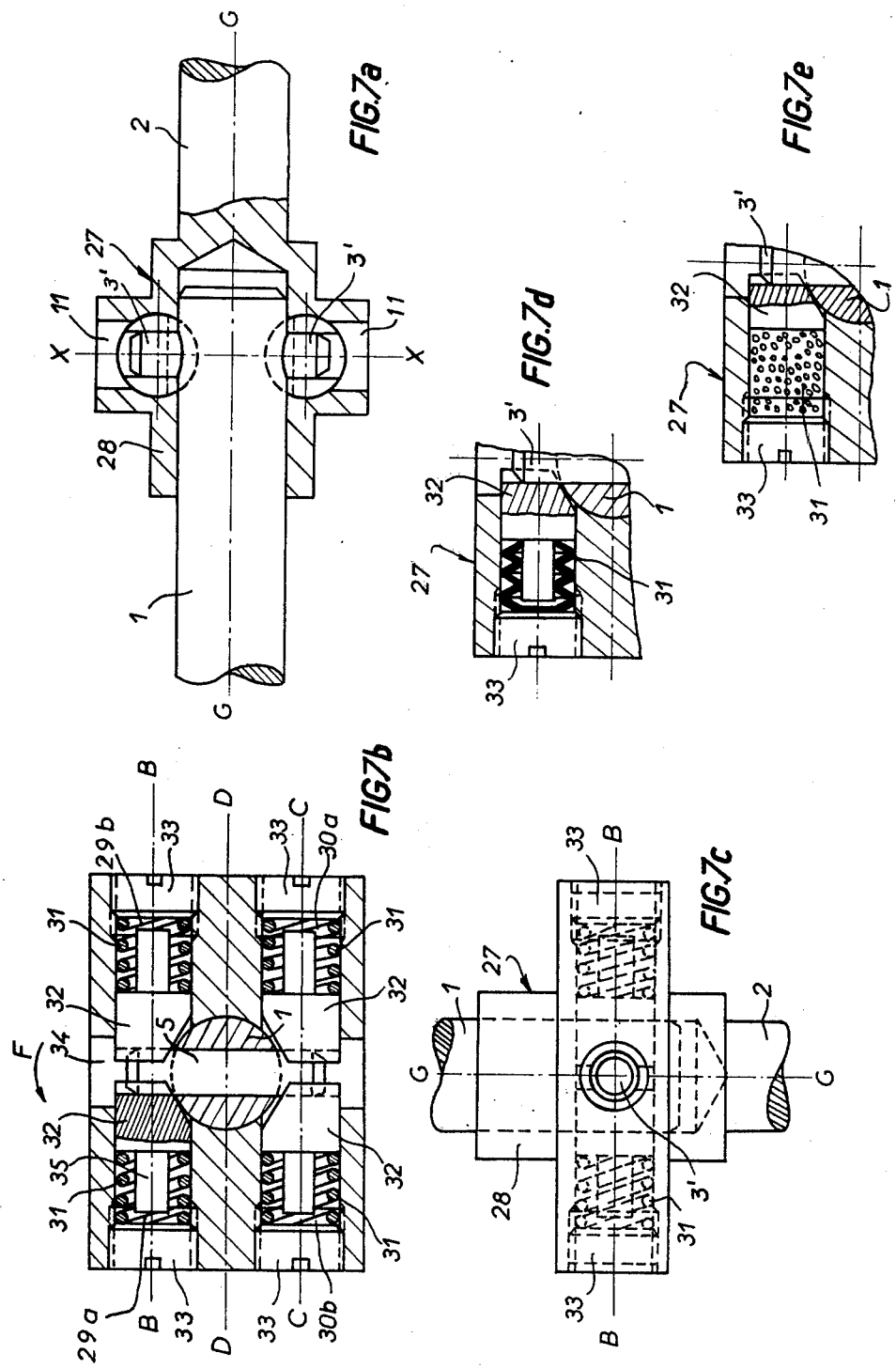

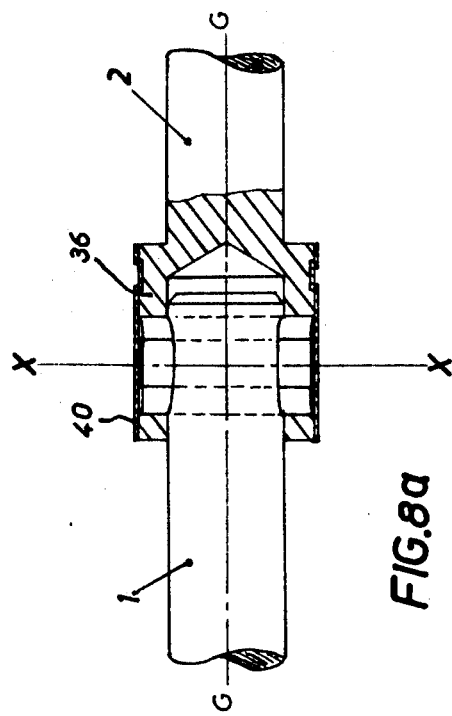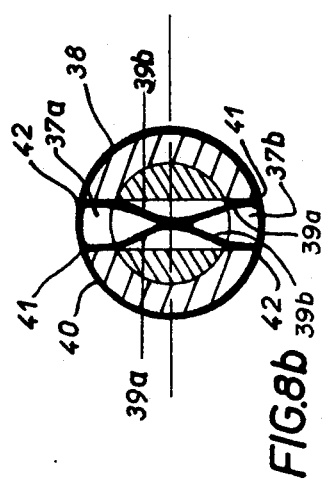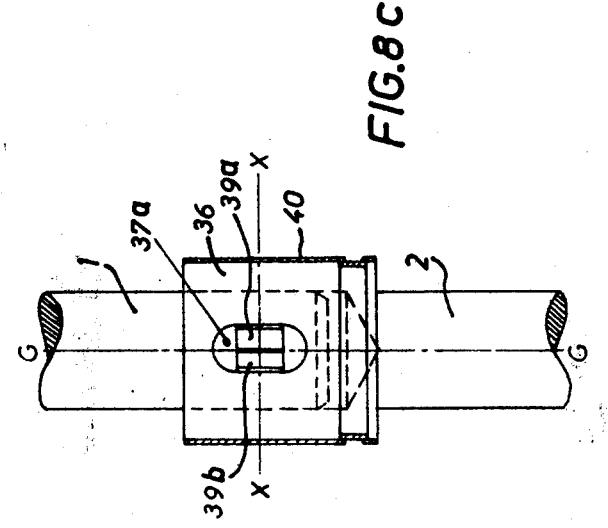

SERVO MECHANISM

This is a continuation, of application Ser. No. 275,771, filed July 27, 1972, now abandoned.

The pressent invention relates to a serve-mechanism for controlling the operating effort of a mechanical member, especially applicable to automatic assistance of the steering of an automobile vehicle.

There are already known, especially in the field of automobile vehicles, servo-mechanisms which are intended are provide automatic assistance of the steering. While such devices generally give satisfaction to the user, they present however certain drawbacks from the point of view of their construction. They ar generally of considerable weight, although furthermore the manufacturers make every effort to reduce the weight of vehicles as far as possible. In addition, they are very bulky and must be most frequently placed in the parts of the vehicle which are already extremely crowded. The result is that even when it is carried out by mass production the cost of mounting of such devices is expensive. If, in addition to this, a device of this kind is to be mounted on a mass-produced vehicle not provided with this device, the cost of the operation is very high by reason of the technical difficulties encountered. Furthermore, devices of this kind absorb a large amount of power.

There also exist steering-assistance devices for automobile vehicles which utilize electrical energy but which, especially by reason of their large overall size, do not appear to have received any extended practical applications up to the present time.

The present invention obviates these difficulties by providing an electrical serve-control device which is particularly compact and for this reason can readily be adapted to all vehicles at present known, absorbing only a small amount of power and having a moderate production cost.

The servo-mechanism according to the invention, intended for the servo-control of the operation force of a mechanical member, the said force being applied through the intermediary of a shaft movable in rotation about its axis, known as a steering shaft, is essentially characterized by the fact that it comprises, in combination:

A steering shaft comprising two coaxial sections, the first of which is coupled to a hand-wheel controlling its rotation about the common axis of the two said sections, and the second of which is connected to the mechanical member to be controlled and assisted, this second section being rigidly fixed to a terminal sleeve which is coaxial therewith and surrounds a part of the first, which is provided with a pin arranged in one of its diametral planes, the wings of the said pin being identical and extending by the same length beyond each side of the common axis, the second section co-operating with the first through the intermediary of the wings of the said pin and of an elastic member interposed between the said pin and the second section;

An electric motor for assisting the mechanical member, the stator of which is fixed with respect to the support of the servo-mechanism and in which the rotor co-operates in the rotational drive about its axis of the section of the steering shaft on which the sleeve is fixed, either directly or through the intermediary of a member transmitting the rotation of the rotor to the said section;

A device for converting to electric signals, according to a pre-determined law, the value of the angle of the relative rotation of the section of the steering shaft provided with the pin with respect to the section provided with the sleeve, the said device co-operating with the section provided with the pin being connected by input terminals to a source of electric energy and having output terminals connected to the supply terminals of the electric motor.

According to a first form of embodiment, the device for conversion to electric signals of the value of the angle of relative rotation of the two sections of the steering shaft, comprises, in combination:

An angular displacement detector having an internal law, connected electrically on the one hand to the source of electrical energy, and on the other hand to a rotating contact fixed to the section of the steering shaft comprising the sleeve, the fixed portion of the said detector being fixed to the said sleeve, its rotatable portion co-operating with the section of the steering shaft carrying the pin through the intermediary of a member for converting the rotation of the said section about its axis into a movement of rotation of the moving part of the said detector about its axis;

An electrical analogue calculating device electrically connected on the one hand to the source of electrical energy and on the other hand to the angular displacement detector with which it co-operates, through the intermediary of a rotating contact rigidly fixed to the section of the steering shaft provided with a sleeve, and coaxial with this latter.

According to another simplified form of embodiment, the device for converting to electric signals the value of the angle of relative rotation of the two sections of the steering shaft is constituted by two sets of two contacts, each arranged on one of the faces on one of the two recesses in the sleeve, and by two sets of two contacts each disposed on the other face of the same recess, one of the contacts of each set being connected respectively to the two terminals of the source of energy and the other contact being connected to a terminal of the motor, the wing of the pin corresponding to this recess being provided on each of its faces opposite the contact sets of connecting bars of the contacts of a single set.

According to another form of construction, more particularly applicable to automobile vehicles, the device for converting the value of the angle of relative rotation of the two sections of the steering shaft to electric signals comprises, in combination:

An angular displacement detector having an internal law, connected electrically on the one hand to the source of electrical energy associated with the vehicle, and on the other hand to a rotating contact rigidly fixed on the section of the steering shaft comprising the sleeve, the fixed portion of the said detector being rigidly fixed to the said sleeve, its rotatable portion co-operating with the section of the steering shaft carrying the pin, through the intermediary of a member converting the rotation of the said section about its axis to a movement of rotation of the moving part of the said detector about its axis.;

An analogue calculating device, electrically connected on the one hand to the source of electrical energy of the vehicle, and on the other hand to the angular displacement detector, through the intermediary of a rotating contact, rigidly fixed to the section of the shaft provided with the sleeve, and coaxial with this latter;

A centre-point potentiometer co-operating with the cable of the speedometer, the fixed portion of which is fast with the body of the said speedometer and the active zone of the said potentiometer comprising, in addition to its neutral zone, at least two ranges of different internal laws, the said potentiometer being electrically connected, on the one hand to the source of electrical energy associated with the vehicle, on the other hand to the analogue calculating device with which it co-operates.

According to an advantageous characteristic feature, the angular displacement detector having an internal law co-operating with the steering shaft is a potentiometer.

According to a form of construction application to the reversible steering mechanism of automobile vehicles, the motor which assists the mechanism member has a stator fixed with respect to the support of the servo-mechanism and a rotor co-operating with the drive in rotation about its axis of the section of the steering shaft on which the sleeve is fixed, through the intermediary of a device for transmitting the rotation of the rotor to the said section, a speed-reduction gear having its driven shaft fixed to the output shaft of the motor, and a coupling device of which the driving member is rigidly fixed to the driven shaft of the reduction gear and the driven member is rigidly fixed to the driving member of the device for transmitting the rotation of the rotor of the motor to the steering shaft, being interposed between the said motor and the said transmission member, the said coupling member being provided with an electro-magnetic operating device for the coupling or uncoupling of the speed-reduction gear to the transmission member for the rotation of the motor, the uncoupling being effected by the absence of supply of electrical energy to the said electro-magnetic operating device, and the coupling caused by its supply with electrical energy through the intermediary of the device which converts the relative rotation of the two sections of the steering shaft to electric signals.

According to a first form of construction of the coupling device between the first and the second section of the steering shaft, the end sleeve fixed on the second section possesses, in the region where it surrounds the first, two identical processed diametrically opposite with respect to the six common to the two sections, the wings of the pin with which the first section is provided being respectively arranged in the recesses of the sleeve, the thickness of the said pin being less than the width of the said recesses, the elastic member interposed between the pin and the second section being constituted by a torsion bar coaxial with the two sections and rigidly fixed to one of them.

According to a second form of construction of the device for coupling the two sections of the steering shaft, the elastic member fixing together the two sections of the shaft is constituted by a casing fixed on the end sleeve of the second section, comprising four identical cylindrical compartments arranged symmetrically in pairs on each side of an axial plane of the sleeve and in pairs coaxially along a common axis perpendicular to the said axial plane, the two corresponding axes being arranged in a plane perpendicular to the longitudinal axis of the sleeve, and in such manner that this same longitudinal axis forms an diametral of symmetry for the said compartment, and by a diametrial pin arranged in an orifice of the first section having the axial plane of the casing as a plane of symmetry, the wings of the said pin also extending on each side of the orifice, each of the four cylindrical compartments comprising a compressible spring interposed between a regulating screw places on the outer side of the casing and a dowel pin placed on the inner side and supported on the corresponding face of a wing of the pin.

According to a first alternative form of this second form of construction of the coupling device for the two sections of the steering shaft, the spring interposed in each compartment of the casing between the regulating screw and the supporting stud on the pin is constituted by a compressible coil spring.

According to a second alternative form of this second form of construction of the coupling device for the two sections of the steering shaft, the spring interposed in each compartment of the casing between the regulating screw and the supporting stud on the pin is constituted by an assembly of identical elastic washers of conical form arranged one afte the other in such manner that each is in contact with the preceeding washer by its large base and with the following washer by its small base.

According to a third alternative form of this second form of construction of the coupling device for the two sections of the steering shaft, the compressible spring interposed in each compartment of the casing between the regulating screw and the supporting stud on the pin is constituted by a compressible elastic filling material.

According to a third form of construction of the coupling device of the two sections of the steering shaft, the elastic member interposed between the first and second sections of the steering shaft is constituted by at least one assembly of two identical spring blades, each of these blades being constituted by a curved central portion and two flat lateral wings, the two elastic blades of each assembly being mounted back to back to their convex faces and arranged in an orifice of the first section having an axial plane of the said section as the plane of symmetry, and to which correspond on the sleeve two diametrically-opposite identical orifices having the same contour, the flat portions of each blade being supported against the opposite flat side faces of the orifices of the sleeve, a closure ring for the said orifices and on which are supported the extremities of each elastic blade being arranged round the end sleeve of the second section and fixed to the said sleeve.

Other characteristic features and advantages of the invention will be more clearly brought out in the description which follows below by way of non-limitative example, reference being made to the accompanying drawings, in which:

FIG. 2 represents a view in axial cross-section of the device according to the invention in the vicinity of the torsion bar with which the steering shaft is provided;

FIG. 3 shows a view in transverse section taken along the line A—A of FIG. 2;

FIG. 4 represents a view in transverse section in the vicinity of the torsion bar corresponding to a particular form of construction of the device according to the invention;

FIG. 5 represents a plan view of a speed indicator provided with a centre-point potentiometer;

FIG. 7a represents a view in axial section of an elastic coupling device in its first form of construction;

FIG. 7b shows a view in cross-section of this device taken along the line X—X of FIG. 7a;

FIG. 7c represents a plan view of the said elastic coupling device;

FIGS. 7d and 7e represent partial views in cross-section of two alternative forms of construction of the compressible springs of the said elastic coupling device:

FIG. 8a represets a view in cross-section through an axial plane of an elastic coupling device in another form of construction;

FIG. 8b represents a transverse section of the device shown in FIG. 8a, taken along the line X—X of this figure;

FIG. 8c represents a plan view of the device shown in FIGS. 8a and 8b.

In these drawings, the same reference numbers have been given to the same parts.

The description which follows below, given as a non-limitative example of the servo-mechanism according to the invention, relates to a servo-mechanism for assisting the steering of an automobile vehicle, but it is clear that such a servo-mechanism may be applied to fields other than that of automobile vehicles, such as air navigation, for example.

Figure 1:
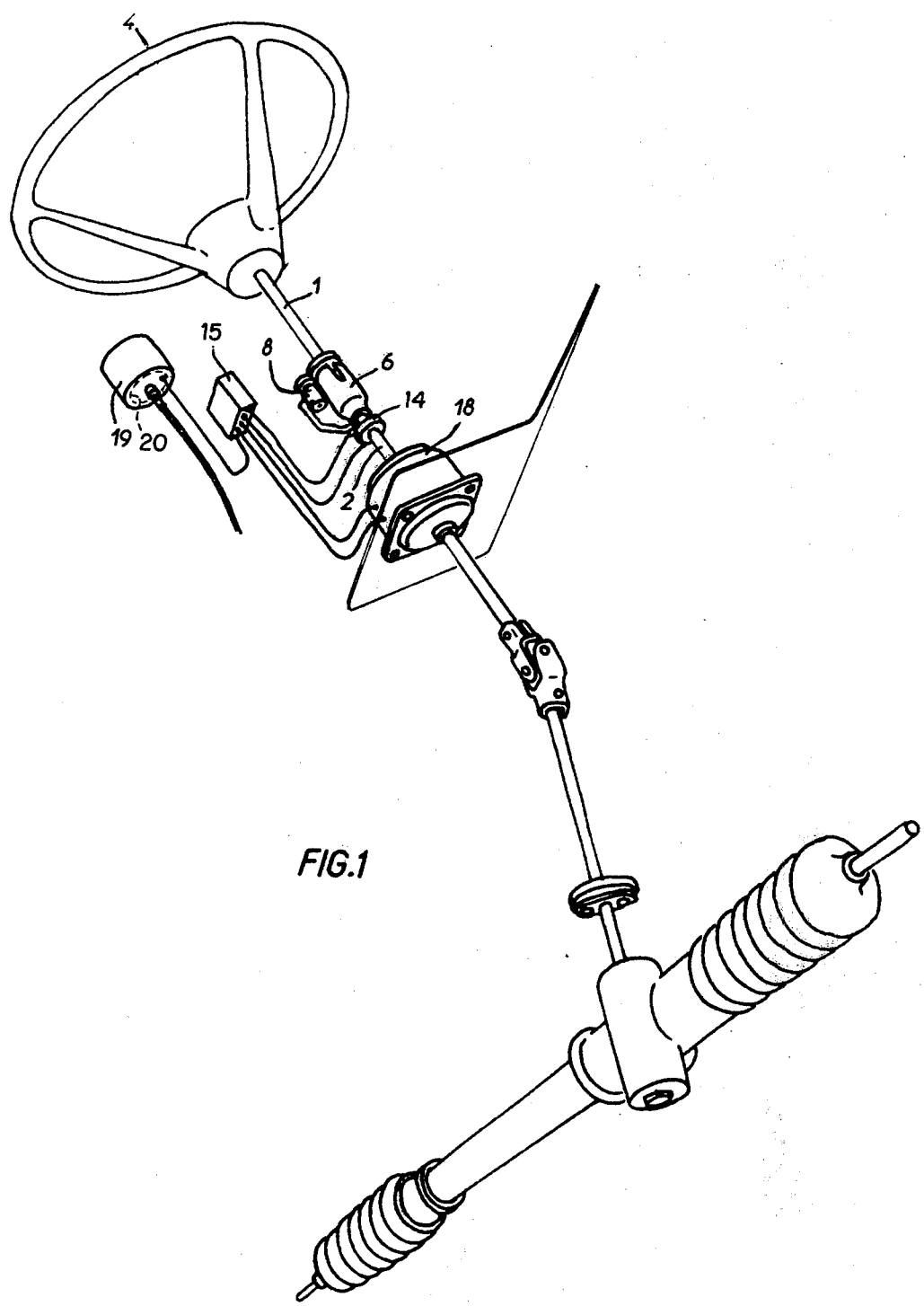
FIG. 1 shows diagrammatically a perspective view of the steering of an automobile vehicle provided with a steering assistance servo-mechanism according to the invention.

Referring now to FIGS. 1, 2 and 3, the steering shaft of the vehicle comprises two coaxial sections 1 and 2, coupled to each other by a torsion bar 3 which is coaxial with then and permits relative rotation of the two sections with respect to each other about their common axis.

The section 1 of the steering column fixed to the steering wheel 4 is provided with a diametral pin 5, having two wings which extend equally on each side of this same section, while the section 2, coupled to the steering members, is fixed to a sleeve 6 having the same axis, and in which are formed two identical longitudinal recesses 7a and 7b. The width 1 of these recesses is such that rotation through a pre-determined angle is possible before the wings of the pin 5 come into contact with the lateral faces of these recesses, the said pin wing having a thickness e less than the width 1. This arrangement makes it possible to limit the torque applied to the torsion bar while at the same time it ensures safety by transmitting the total torque in the event of the torsion bar breaking.

An angular displacement detector 8 arranged on the sleeve 6 to which it is fixed, and which is connected to the source of electrical energy associated with the vehicle, that is to say generally a storage battery, enables the relative angular displacement of the section 1 with respect to the section 2, to be converted to an electrical signal, this displacement being proportional to the torque applied to the steering-wheel 4.

This detector 8 may be of the type comprising resistance inductance, reluctance, capacity, variable or measurable, or it may employ any other variable or measurable electrical quantity. In the form of construction shown in the drawings (see particularly FIGS. 2 and 3), the detector 8 is constituted by a potentiometer, the circular track 9 of which is rigidly fixed to the sleeve 6 while the slider 10, fixed on a shaft 11, is driven in rotation about its axis, either directly or indirectly through the intermediary of two multiplying toothed wheels 12 and 13, of which one 12, coaxial with the shaft 11 is rigidly fixed thereto, and the other 13, coaxial with the section 1, is rigidly fixed to the section 1.

The detector 8 supplied from the source of electrical energy associated with the vehicle is also electrically connected to an appropriate analogue calculating device 15 or computer, through the intermediary of a rotating contact 14 fixed on the section 2 and/or on the sleeve 6 (FIG. 1). The computer 15 of small size and readily housed at any point on the vehicle, and which is for example incorporated into the group of dashboard instruments, receives the electric signal delivered by the detector 8, which signal varies in dependence on the value of the torque applied to the steering-wheel 4, following the internal law of the detector 8.

Contacts 16 and 17 arranged on the opposite faces of one of the recesses formed on the sleeve of the steering shaft, the recess 7b for example, permit the transmission of a signal indicating to the computer 15 the direction of rotation of the steering-wheel 4. The signals coming from the detector 8 and the contacts 16 or 17 are transformed by the computer to a current which varies as a function of the torque applied to the steering-wheel 4, this current supplying an electric assistance motor 18, the stator of which is fixed to a fixed portion of the vehicle, for example the dashboard, while the rotor, fixed to the section 2 of the steering shaft of the vehicle, either directly or through an intermediate member, is actuated by a torque controlled by the computer 15.

According to a simplified version of the device according to the invention (see FIG. 4), the control of the assistance motor 18 is directly effected by the closure of one or the other of the contacts 16a and 16b or 17a and 17b, formed in the sleeve 6, and between which is arranged one of the wings of the pin 5 fixed on the section 1 of the steering shaft, that is to say when a torque of pre-determined value, applied in one direction or in the other on the steering-wheel 4 is reached or exceeded. To this end, a contact terminal 16a is connected to the positive terminal of the current supply source, while its other terminal is connected to the first terminal of the motor 18. One contact terminal 16b is connected to the negative terminal of the said current supply source, the other terminal being connected to the second terminal of the motor.

Similarly, a contact terminal 17a is connected to the negative terminal of the current supply source, while the other terminal is connected to the first terminal of the motor and one of the terminals of the contact 17b is connected to the positive terminal of the current supply source, its other terminal being connected to the second motor terminal. These two faces of the corresponding wing of the pin are each provided with two bars for connecting the terminals of the contacts 16a and 16b on the one hand and of the contacts 17a and 17b on the other. In this way, depending on whether one of the faces of the pin is applied on the corresponding face of the recess 7b, the rotation of the motor 18 takes place in one direction or in the other.

In a further improved form of construction of the device according to the invention, it is possible to modify the law of variation of the assistance torque in dependence, not only of the value of the torque applied to the steering-wheel, but also as a function of the speed of the vehicle.

To this end, a potentiometer 20 having its slider driven by a driving cable of a speedometer 19 (FIG. 5), supplies to the computer a signal variable as a function of the speed of the vehicle, following a pre-determined internal law of the potentiometer 20.

This potentiometer 20 is electrically connected to the computer 15 which combines this signal with that received from the detector associated with the steering shaft, and converts them to a current of intensity variable according to a predetermined law, as a function of the torque applied to the steering-wheel and of the speed of the vehicle.

It is also possible to improve the form of construction of the device according to the invention, as described above, in the following manner (see FIG. 5).

The potentiometer 20 is of the so-called centre-point type and is associated with the speedometer 19.

In a portion A of the potentiometer 20, corresponding to the speeds of the vehicle for which the maximum assistance is desired, the potentiometer 20 delivers to the computer 15 a signal of the same form as the signal delivered by the potentiometer 8, associated with the steering column.

In the central portion B of the potentiometer 20, corresponding to the vehicle speeds for which no assistance is necessary, the value of the resistance of the potentiometer 20 is practically nil, and in consequence the computer 15 receives no signal, and does not transmit any signal to the assistance motor 18.

In the portion C of the potentiometer 20, corresponding to the speeds for which the steering becomes light, the said potentiometer 20 delivers a signal which is the reverse of that delivered in the zone A. The computer 15 then transmits to the assistance motor 18 a reversed signal which applies to the steering shaft a pre-determined resistive torque which gives the driver the firmness of steering which is desirable at high speed.

In one case as in the other, the rotor of the motor 18 which operates the steering mechanism is in engagement with the section 2 of the steering shaft coupled to the steering mechanism, preferably through the intermediary of a reduction gear, which generally is not reversible, which implies that the steering is controlled in both directions, that is to say the driver of the vehicle, after having effected the turning of the front wheels of the vehicle in one direction so as to cause it to turn, causes, by means of the servo-control device embodied in the present system, the return of the said front wheels to their normal position in which they are parallel to the central longitudinal plane of the vehicle.

In the case where the steering of the vehicle is of the reversible type, that is to say such that, when the vehicle is passed round a turning, the front wheels return to their normal position with the driver having to apply any torque on the steering wheel for that purpose; if the steering is not assisted, the assistance device described above necessitates, due to the irreversibility of the motor interposed between the shaft of the driving motor and the steering column, that the driver must apply a torque on the steering-wheel in order to obtain the return of the front wheels to their normal position.

In this case it is possible, according to the invention and by means of a simple improvement of the servo-mechanism described above, to obtain the return of the front wheel of the vehicle to their normal position for running in a straight line, after turning, without the drive having to apply a torque on the steering wheel in order to obtain this return.

Figure 6:
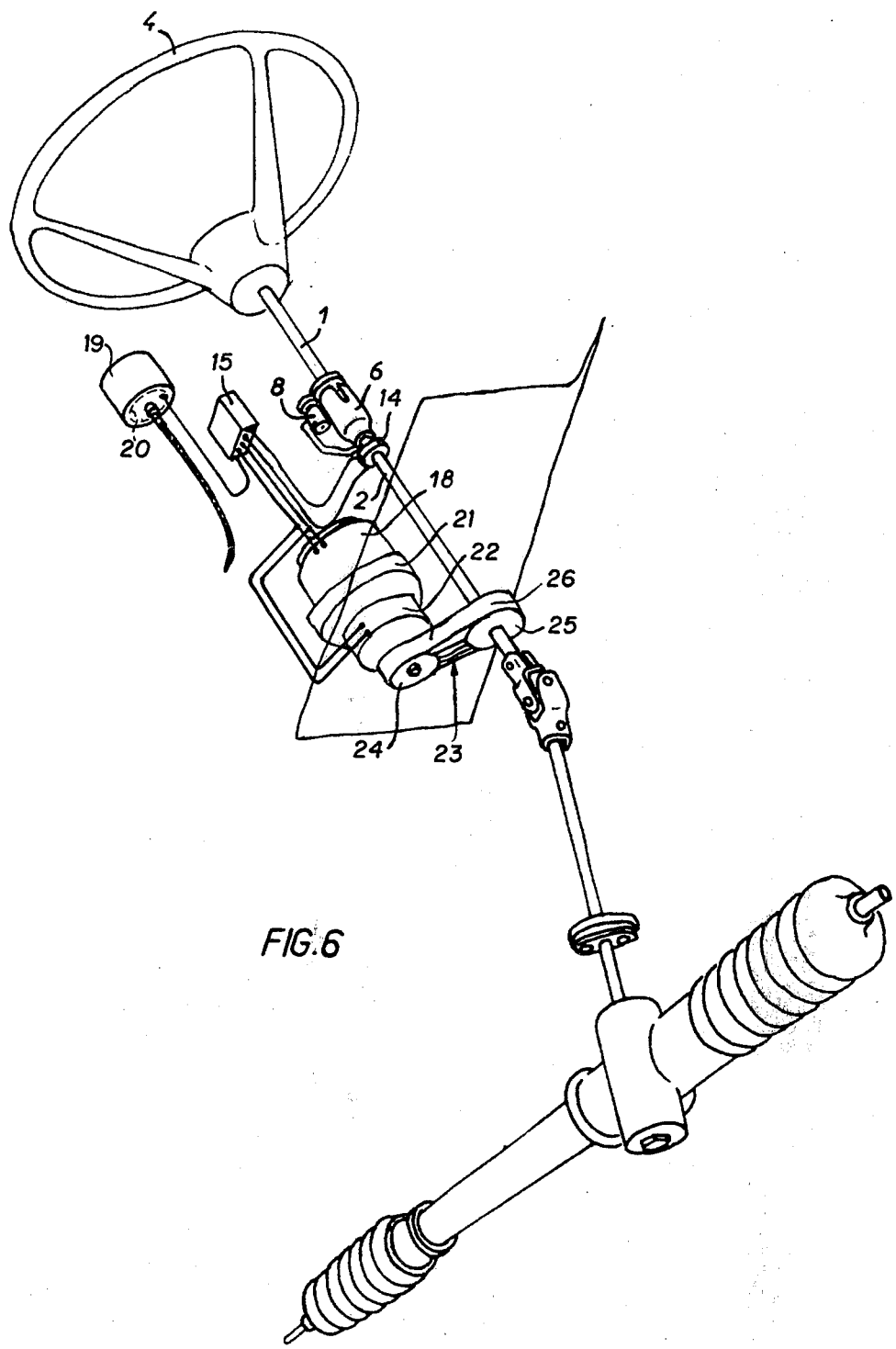
FIG. 6 shows diagrammatically a perspective view of the steering of an automobile vehicle provided with a servo-mechanism applicable to a reversible steering mechanism.

To this end, the assistance motor 18, as shown in FIG. 6, has a stator rigidly attached to a fixed part of the vehicle, for example its dashboard, and a rotor made fixed by means of its output shaft to the input shaft of a speed-reduction gear 21 of any appropriate known type. The output shaft of the reduction gear 21 is fixed to a coupling member preferably constituted by a clutch with electro-magnetic control 22, of known type, this clutch being interposed between the reduction gear 21 and a transmission member 23 which transmits the rotation of the output shaft of the said reduction gear 21 to the section 2 of the steering shaft co-operating with the steering mechanism of the vehicle.

The clutch 22 is a clutch of known type, for example of the friction or dog type, in which the fixed element may be either fixed to the output shaft of the reduction gear 21 or fixed to the input shaft of the transmission member 23, its moving element being then respectively fixed either to the transmission member 23 or to the output shaft of the reduction gear 21. The application of the moving element of the clutch 22 on the fixed element for the purpose of transmission of the movement of rotation of the output shaft of the reduction gear 21 to the input shaft of the transmission member 23 is obtained in known manner by means of al electro-magnetic device supplied with electric energy and such that the elimination of this supply of electric energy causes the uncoupling of the mobile element from the fixed element, that is to say the release of the clutch 22.

The electro-magnetic device associated with the clutch 22 is supplied with electric power by the ame circuit as that by which the motor 18 is supplied. To this end, the terminals of the electro-magnetic device are advantageously electrically connected respectively to the corresponding terminals of the said motor which, as is known, are connected to the output terminals of the device of the computer 15.

Under these conditions, it is then clear than when the motor 18 is fed with electrical energy, the electro-magnetic control device for the clutch 22 is also energized and that in consequence, the said clutch 22 is in the engaged position. Conversely, when the value of the current supplying the motor 18 is zero, the clutch is in the released position.

The member 23 transmitting the rotation of the output shaft of the reduction gear 21 (through the intermediary of the clutch) to the steering shaft may be constituted by any appropriate known device such as for example the assembly constituted by a driving pulley 24 fixed on the output shaft of the clutch and a driven pulley 25 fixed on the section of the steering shaft, driven by the first by means of a belt 26, the diameters of the pulleys 24 and 25 being equal or different, depending on the step-down gear ratio desired. It is clear that any other equivalent transmission member, for example with pinions and toothed pinion chains or the like may be utilized for the purpose of driving the section 3 of the steering shaft.

The operation of the servo-control mechaniism of the reversible steering is, under these conditions, as follows: when the driver of the vehicle applies a torque on the steering wheel in order to turn the vehicle, the steering mechanism is assisted from the moment when the angle of movement of the wing of the pin 5 in the recess 7b in the sleeve 6 is exceeded (the position of the pin inside this angle corresponding to the neutral zone of the detector), the magnitude of this assistance being a function of the internal law of operation of the detector. The motor 18 is supplied with electric power and in consequence the electro-magnetic clutch control device is also energized.

For this reason, the movement of rotation of the motor 18 is transmitted, geared down, to the section 2 of the steering shaft, the clutch 22 being in the engaged position. When the driver stops applying on the steering wheel 4 the torque necessary to obtain the change in direction of the vehicle, the torsion bar 3 which up to that moment was under stress, is relieved and the section 1 of the steering shaft returns to its position of rest with respect to the said torsion bar 3 which has the effect of bringing back the wing of the pin 5 into the zone corresponding to the angle of movement, and in consequence the slider 10 of the detector 8 into its neutral zone.

The motor 18 is then no longer supplied with electrical energy and also in consequence, the electro-magnetic control device of the clutch 22 is de-energized and then passes into the released position. The steering mechanism which is then freed from the motor 18 becomes free. The reversibility device of the steering may then act and bring the steering wheels of the vehicle into their normal position, that is to say parallel to the longitudinal central plane of the vehicle.

It is clear that the various alternative forms described above and relating either to the simplification of the servo-control mechanism proper or to its improvement by which the amount of assistance may vary as a function of the speed of the vehicle, find their application in the particular form of the invention which has just been described, since the de-clutching device which it describes is located wholly downstream of the servo-mechanism proper.

Whatever may be the form of construction of the servo-motor, the effort applied by the driver on the steering-wheel and in consequence on the section of the steering shaft to which it is fixed, is transmitted to a second section of this shaft coupled to the steering mechanism first through the intermediary of a torsion bar coupling these two sections together as long as the angle of rotation of the steering wheel does not exceed a pre-determined value, that is to say as long as this rotation is effected inside an angle of movement having a pre-determined value, and then directly by means of the assembly constituted by the sleeve fixed on the said second section and the diametral pin arranged on the first section, the torsion bar then maintaining a constant torsion.

Under these conditions, the angular movement of the first section with respect to the second is converted, as is known, to an electric signal by means of an angular displacement detector. The torsion bar constituting the elastic member interposed between the two sections of the steering shaft has a fixed elasticity resulting from its various characteristic such as length, diameter, nature of the constituent metal, citing only the main ones, and which imposes by its construction the value of the relative angular displacement of the two sections of the steering shaft as a function of the torque applied by the driver on the steering wheel, once and for all.

The consequence is that, if for various reasons it becomes necessary to modify the amount, in one direction or in the other, of the assistance which it is desired to supply to the second section of the steering shaft, one is most frequently led to modify the characteristics of certain members of the servo-mechanism or even to replace them by other members having characteristics more suitable for the result desired, which necessitates work of dismantling and reassembly, which is more or less long and more or less expensive.

The Applicant has found that it could then be much more advantageous in achieving the same result to interpose between the two sections of the steering shaft an elastic member whose elasticity may — at least within sufficiently wide limits — be adjustable, as described below.

Referring first to FIGS. 7a, 7b, 7c, 7d and 7e, the steering shaft of the vehicle comprises a first section 1 coupled to the steering column, and a second section 2 coupled to the steering mechanism and coaxial with the first. This second section is provided at its extremity opposite to the steering mechanism with a member 27 directly fixed to this same section. The member 27 comprises a sleeve or a sheet 28 coaxial with the two sections, driven on the section 1 and fixed thereto by means of a pair of diametrically oppositely disposed pins 3' each, having a shaft perpendicular to a shaft axis G—G common to the two sections 1 and 2 and passing through appropriate orifices 11 formed at the same time in the member 27 and the section 1.

The member 27 further comprises a portion having the general shape of a rectangular parallelepiped in which the longitudinal plane of symmetry X—X is perpendicular to the axis G—G common to the two sections 1 and 2, and which is provided with four identical orifices, cylindrical for example, 29a, 29b on the one hand and 30a and 30b on the other, the orifices 29a and 29b being coaxial, their axis B—B being at right angles to the common axis G—G of the two sections 1 and 2, while the orifices 30a and 30b are also coaxial, their common axis C—C being also at right angles to the axis G—G, the two axes B—B and C—C being placed in a plane perpendicular to the axis G—G and symmetrical with each other with respect to the axis D—D of this plane which is parallel to them and perpendicularly intersects the axis G—G.

Each of these orifices comprises a compressible elastic member 31 constituted for example either by a coiled spring (see FIGS. 7b and 7c) or by an assembly of elastic washers of genrally frusto-conical shape in contact with each other alternately by their large and small bases, the said large bases having a diameter equal to the internal diameter of the orifice (see FIG. 7d) or alternatively by a compressible material such as expanded polyurethane or any other similar material having the property of compressing itself when it is subjected to a force and resuming its initial form when this force is no longer applied, the law of its deformation as a function of the forces to which it is subjected remaining invariable in time (see FIG. 7e).

The compressible elastic member 31 is interposed in each orifice, on the one hand between a stud or wedge 32, of which one face is in contact with one extremity of the said elastic member and the other face with the pin 3', the said wedge being movable laterally in the corresponding orifice parallel to its axis, and on the other hand a regulating screw 33 closing the corresponding orifice externally. The member 27 is also provided with a central orifice 34, the axis E—E of which is located in the plane of the axes B—B and C—C, is perpendicular to tham and intersects the axis G—G of the section 1. This orifice which opens into the two corresponding opposite faces of the member 27 enables the pin 3' to be placed in position for fixing together the sections 1 and 2 or its removal for taking the sections apart.

In these conditions, when the sections 1 and 2 of the steering shaft are fixed to each other through the intermediary of the pin 3' and when the sectional 1 is driven in rotation about its axis by means of the steering wheel, for example in the direction of the arrow F of FIG. 7b, the pin 3' is driven in this rotation and pushed back the wedges 32 of the orifices 29a and 30a of the member 27, which has the effect of compressing the springs 31 (or similar compressible elastic members) in their respective housings, while on the contrary, the wedges 32 of the orifices 29b and 30b are pushed back by the corresponding springs 31 which expand and follow the movement of the pin. The system of forces thus applied to the part 27 through the intermediary of the said pin are reduced to a torque applied to the said part 27 and in consequence to the section 2, and of the same direction as the torque applied to the section 1 through the intermediary of the steering-wheel.

It is clear that when the said section is driven in rotation about its axis in a direction opposite to that preceding, that is to say in the direction opposite to that of the arrow F of FIG. 7b, the springs of the orifices 29b and 30b are compressed while those of the orifices 28a and 30a expand and that then the system of forces applied to the part 27 is reduced to a torque driving the section 2 of the steering shaft in rotation about its axis, in the same direction as that applied to the section 1.

The wedges 32 each comprise a cylindrical extension 35 the length of which is less than that of the corresponding elastic member when it is in the state of rest, so that in this state, the extremity of this extension arranged opposite the inner face of the corresponding screw 33 is separated from it by a certain distance which may furthermore be varied by acting on the corresponding regulating screw, which has the further effect of varying the tension of the compressible elastic member 31 corresponding.

In this way, when the section 1 of the steering shaft has effected a rotation of a value α for example, in the direction of the arrow F of FIG. 7b, the extremities of the extensions 35 of the wedges 32 come simultaneously into contact with the inner faces of the regulating screws 33 of the orifices 29a and 30a, if the said screws have been regulated in such manner that the elastic members 31 have the same tension. Thus, when the angle of rotation of the section 1 fixed on the steering-wheel has a value lower than α, the transmission of the torque applies on this section 1 to the section 2 is effected elastically, as in the case in which the two sections 1 and 2 are separated by a torsion bar, and when the angle of rotation of the said section 1 has a value greater than α, the section 2 is driven directly in rotation by the section 1, the extensions of the wedges 32 corresponding to each other in the orifices 29a and 30a (or 29b and 30b) being directly supported against the member 27 rigidly fixed to the section 2 by means of the corresponding regulating screws 33.

The device described above is thus quite equivalent to the torsion bar device, with the difference however that the elasticity of the torsion bar cannot be adapted at will, while the elasticity of the member 3 can be regulated at will either by acting on the regulating screws 33, or also by replacing, all other things being equal furthermore, the elastic members 31 by other members having a different elasticity, while simultaneously, the value of the movement angle α can be regulated by acting on the length of the extensions 35 of the wedges 32.

According to another form of construction shown in FIGS. 8a, 8b and 8c, the steering shaft comprises a first section 1 having an axis G—G and fixed to the steering wheel, and a second section 2 coaxial with the first, of which one extremity co-operates with the steering mechanism while the extremity opposite to that preceding is provided with a sleeve 36 having the same internal diameter as the diameter of the section 1 and surrounding this latter.

The sleeve 36 comprises an assembly of two orifices 37a and 37b identical and diametrically opposite, the common axis of which intersects the axis G—G and is perpendicular thereto, while the section 1 also comprises a diametral orifice 38 of the same apparent contour as the orifices 37a and 37b arranged coaxially therewith, that is to say in such manner that their apparent contours coincide so as to form a common orifice for the sleeve 36 and the section 1.

In this common orifice is arranged at least one assembly of two spring blades 39a and 39b which are identical and each having an concave central portion arranged in the orifice 38 of the section 1 and two flat opposite extremities respectively supported on the lateral faces of the orifices 37a and 37b of the sleeve 36, the two said blades being supported against each other by their convex faces on the axis G—G common to the two sections, their concavities being respectively placed opposite the internal lateral faces of the orifice 38.

A number of assemblies of two blades such as the blades 39a and 39b may thus be arranged side by side in the orifice common to the sleeve 36 and the section 1. The assembly of spring blades is held in position in the common orifice by means of an annular casing 40 which may be inset on the sleeve 36.

The device thus obtained carries out the same function as the unit constituted by a torsion bar and a pin as described above, but has with respect to this latter the advantage of being adjustable. In fact, the torque applied by means of the steering wheel on the section 1 of the steering shaft is applied to the section 2 of this same shaft through the intermediary of the assemblies of spring blades 39a, 39b.

The multiplication of these springs by sets of two in order to maintain the symmetry of the torques transmitted from the section 1 to the section 2 in both directions, makes it possible to vary, in regular successive steps, the value of the torque to be applied on the section 1 so as to bring the extremities 41 of the springs 39a on the extremities 42 of the springs 39b, the said springs, when they are thus applied one against the other, playing the part of a pin fixing together the two sections.

In other words, for a permitted movement α of the section 1 with respect to the section 2, by suitably choosing the characteristics of the spring blades and the number of sets of two of these blades, it is possible to vary the torque which it is necessary to apply on the section 1 in order to carry out the permitted movement α.

It will of course be understood that the present invention has been described and illustrated only by way of a preferred example, and that technical equivalents may be made in its constituent elements without thereby departing from the scope of the said invention, as defined in the appended claims.

I claim:

1. A power steering assembly which comprises a steering shaft having first and second coaxial sections, a torsion bar connecting said sections, a steering wheel for manually rotating said first section, diametrically opposed wings projecting laterally from said first section, a sleeve fixed to said second section having diametrically opposed recesses receiving said wings, said recesses being wider than said wings to accommodate limited rotation of said first section relative to said second section through twisting of said torsion bar, said wings abutting the side walls of said recesses to couple the first and second sections for corotation detector, to limit the twisting of said torsion bar, an angular displacement electrical detector converting into an electrical signal angular displacement of said first section relative to said second section proportional to torque applied to the steering wheel, a computer receiving said electrical signal froms aid detector an electric motor driving said second shaft section, electrical contacts on said wings, cooperating electrical contacts on said sleeve, an electrical current circuit including said contacts controlling the direction of rotation of said motor, said contacts being arranged so that said second shaft will be rotated by said motor in the same direction as said first shaft, and said computer controlling current flow in said circuit to vary the current input as a function of the torque applied to the steering wheel whereby rotation of the first and second steering shaft sections controls the power input to said second shaft section and the wings and sleeve provide a direct coupling of the first and second shaft sections when angular displacement thereof exceeds a predetermined degree.

2. The power steering assembly of 1 wherein the annular displacement electrical detector is a potentiometer with a circular track fixed to said sleeve and a slider riding on said track driven by said first shaft section.

3. The power steering assembly of claim 2 wherein the potentiometer is electrically connected to the computer by a rotating contact fixed on the second shaft section.

4. The power steering assembly of claim 2 including an automotive vehicle steered by said assembly, a speedometer on said vehicle, and means supplying a signal from the speedometer to the computer as a function of the speed of the vehicle for decreasing the power input to the motor as the speed of the vehicle increases.

5. The power steering assembly of claim 1 including a clutch between the motor and the second shaft energized by current supplied to the motor and upcoupling the motor and shaft when the motor is not energized so that manual rotation of the second shaft by the first shaft will not be impeded by the motor.

6. A power steering apparatus for automotive vehicles and the like which comprises first and second coaxial steering shaft sections, a steering wheel on said first section for manually rotating said first section, a torsion bar connecting said first and second sections, lateral wings on said first section, a sleeve member on said second section having recesses freely receiving said wings, said wings being spaced from the walls of said recesses until rotating torque is applied to the steering wheel whereupon the torsion bar will be twisted until the wings engage the sleeve to drive the second section, a reversible electric motor driving said second section, an electrical circuit energizing said motor, electrical contacts in said circuit between one of said wings and opposite sides of the recess receiving said wing to control the direction of current flow to the motor, a potentiometer converting into an electrical signal angular displacement of the first section relative to the second section proportional to torque applied to the steering wheel, a computer receiving said electrical signals from said potentiometer controlling current input to said motor, a second potentiometer driven by the vehicle as a function of the speed of the vehicle and electrically connected to said computer to combine its signal with the signal from the first potentiometer to control the current feed to the motor as a combined function of torque applied to the steering wheel and the speed of the vehicle, an electrical magnetic clutch energized by current supplied to the motor coupling the motor of the second section whereby termination of current supplied to the motor will de-energize the clutch and the first shaft section will rotate the second shaft section without resistance from the motor.

7. A power steering assembly for a steerable vehicle having a manually operated steering wheel and a dirigible wheel which assembly comprises a rotatable steering shaft located between the manually operated steering wheel and the dirigible wheel, means operatively associated with said shaft for translating a manually applied rotary input into steering motion of said dirigible wheel, electrical motive means operatively associated with said rotatable shaft for applying an assisting torque thereto, means responsive to rotation of said rotatable shaft for actuating said electrical motive means, and further means responsive to vehicle velocity for controlling the magnitude of the assisting torque of said electrical motive means as a continuous function of vehicle velocity so as to decrease the magnitude of the assisting torque supplied by said electrical motive means as velocity of the vehicle increases.

8. A power steering assembly for a steerable vehicle having a manually operated steering wheel and a dirigible wheel which assembly comprises a rotatable steering shaft located between the manually operated steering wheel and the dirigible wheel, means operatively associated with said shaft for translating a manually applied rotary input into steering motion of said dirigible wheel, electrical motive means operatively associated with said rotatable shaft for applying an assisting torque thereto, and control means responsive to vehicle velocity and to torque applied to said rotatable shaft for controlling the magnitude of the assisting torque of said electrical motive means as a continuous function of said vehicle velocity and said torque applied to said rotatable shaft wherein said control means operated continuously when the vehicle is moving and further wherein said control means serves, for any selected torque input, to decrease the magnitude of the assisting torque as vehicle velocity increases.

9. A power steering assembly for a steerable vehicle having a manually operated steering wheel and a dirigible wheel which assembly comprises a rotatable steering shaft located between the manually operated steering wheel and the dirigible wheel, means operatively associated with said shaft for translating a manually applied rotary input into steering motion of said dirigible wheel, electrical motive means operatively associated with said rotatable shaft for applying an assisting torque thereto, means responsive to rotation of said rotatable shaft for actuating said electrical motive means, a computer, means feeding a signal to the computer as a function of vehicle velocity, means feeding a singal to the computer as a function of torque applied to the steering wheel, and wherein said computer controls electrical input to the electrical motive means as a function of both said torque applied to said steering wheel and said vehicle velocity so as to thereby control the magnitude of said assisting torque in accordance therewith.

10. A power steering assembly for a steerable vehicle having a manually operated steering wheel and a dirigible wheel which comprises a rotatable steering shaft located between the manually operated steering wheel and the dirigivle wheel, means operatively associated with said shaft for translating a manually applied rotary input into steering motion of said dirigible wheel, electrical motive means operatively associated with said rotatable shaft for applying an assisting torque thereto, further means responsive to vehicle velocity for controlling the magnitude of the assisting torque of said electrical motive means as a function of vehicle velocity including a computer, means responsive to rotation of said rotatable shaft for actuating said electrical motive means, means feeding a signal to the computer as a function of vehicle velocity, and means feeding a singal to the computer as a function of torque applied to the steering wheel wherein said computer controls electrical input to the electrical motive means to maintain a firm variable torque input requirement to the steering wheel, and wherein the computer transmits a reversed signal adding a predetermined resistive torque to the rotatable shaft at high vehicle velocities to provide a firmness of steering at high velocities.

11. The power steering assembly of claim 10 and further comprising a electrical clutch between said electrical motive means and said rotatable shaft, said clutch being electrically connected such that said clutch is engaged when said electrical motive means is actuated and is disengaged when said electrical motive means is not actuated, such that said rotatable shaft may rotate freely of said electrical motive means when said electrical motive means is not actuated.

12. A power steering assembly for a steerable vehicle having a manually operated steering wheel and a dirigible wheel which assembly comprises a rotatable steering shaft located between the manually operated steering wheel and the dirgible wheel, means operatively associated with said shaft for translating a manually applied rotary input into steering motion of said dirigible wheel, electrical motive means operatively associated with said rotatable shaft for applying an assisting torque thereto, means responsive to rotation of said rotatable shaft for actuating said electrical motive means, further means responsive to vehicle velocity for controlling the magnitude of the assisting torque of said electrical motive means as a function of vehicle velocity, and an electrical clutch between said electrical motive means and said rotatable shaft, said clutch being electrically connected such that said clutch is engaged when said electrical motive means is actuated and is disengaged when said electrical motive means is not actuated, such that said rotatable shaft may rotate freely of said electrical motive means when said electrical motive means is not actuated.

13. A power steering assembly for a steerable vehicle having a manually operated steering wheel and a dirigible wheel which assembly comprises a rotatable steering shaft located between the manually operated steering wheel and the dirigible wheel, means operatively associated with said shaft for translating a manually applied rotary input into steering motion of said dirigible wheel, electrical motive means operatively associated with said rotatable shaft for applying an assisting torque thereto, means responsive to rotation of said rotatable shaft for actuating said electrical motive means, and further means responsive to vehicle velocity for controlling the magnitude of the assisting torque of said electrical motive means as a function of vehicle velocity, wherein said rotatable steering shaft comprises first and second coaxial sections and an elastic member connecting said first and second section, said first section being for connection to the manually operated steering wheel and said second section being mechanically coupled to said electrical motive means and wherein said means responsive to rotation of said rotatable shaft comprises means responsive to a predetermined amount of relative rotation of said first and second sections.

14. The power steering assembly of claim 13 further comprising means associated with said elastic member for adjusting the elasticity of said elastic member, whereby the magnitude of relative rotation of said first and second sections in response to the predetermined torque applied to said first section is adjustable.

15. A power steering asesmbly comprising a steering shaft having a first section for connection to a manual steering wheel, a second section coaxial with said first section and for coupling to means for translating rotation of said second section into steering motion, and an elastic member connecting said first and second sections, limiting means for limiting the maximum relative rotation of said first and second sections to a predetermined angle and for coupling said first and second sections for corotation upon relative angular displacement of said first and second sections by the predetermined angle, electrical motive means for supplying a torque to said second section, means responsive to relative rotation of said first and second sections by the predetermined angle for actuating said electrical motive means, and further means responsive to vehicle velocity for providing a signal indicative thereof, and means for controlling the torque supplied by said electrical motive means in response to said signal.

16. A power steering system according to claim 15 wherein said means for controlling torque comprising a computer, and further comprising means for prividing a signal to said computer indicataive of torque applied to said first section, such that torque supplied by said electricl motive means is a combined function of torque applied to said first section and vehicle velocity.

17. The power steering assembly of claim 15 further comprising means associated with said elastic member for adjusting the elasticity of said elastic member, whereby the magnitude of relative rotation of said first and second sections in response to a predetermined torque applied to said first section is adjustable.

18. A power steering assembly comprising a steering shaft having a first section for connection to a manual steering wheel, a second section coaxial with said first section and for coupling to means for translating rotation of said second section into steering motion, and an elastic member connecting said first and second sections, limiting means for limiting relative rotation of said first and second sections to a predetermined angle and for coupling said first and second sections for corotation upon relative angular displacement of said first and second sections by the predetermined angle, electrical motive means for supplying a torque to said second section, means responsive to relative rotation of said first and second sections by the predetermined angle for actuating said electrical motive means, means responsive to torque applied to said first section for controlling the magnitude of torque supplied by said electrical motive means, and means associated with said elastic member for adjusting the elasticity of said elastic member, such that the level of torque applied to said first section to cause actuation of said electrical motive means is selectable.

* * * * *

UNITED STATES PATENT OFFICE
CERTIFICATE OF CORRECTION

Patent No. 3,983,953            Dated October 5, 1976

Inventor(s) Robert Bayle

It is certified that error appears in the above-identified patent and that said Letters Patent are hereby corrected as shown below:

Column 13, line 15 omit "detector".

Column 13, line 15 change "," to --and--.

Column 13, line 21 change "forms" to --from--.

Column 13, line 21 change "aid" to --said--.

Column 13, line 21 insert "," after --detector-- and before --an--.

Column 13, line 55 change "upcoupling" to --uncoupling--.

Column 14, line 55 change "operated" to --operates--.

Column 15, line 28 change "singal" to --signal--.

Column 16, line 50 change "prividing" to --providing--.

Column 16, line 51 change "indicataive" to --indicative--.

Column 16, line 53 change "electricl" to --electrical--.

Signed and Sealed this

Twenty-ninth Day of March 1977

[SEAL]

Attest:

RUTH C. MASON            C. MARSHALL DANN
*Attesting Officer*            *Commissioner of Patents and Trademarks*